E. HOPKINSON.
WRAPPER FOR ARTICLES OF MERCHANDISE.
APPLICATION FILED NOV. 23, 1914.
1,156,080. Patented Oct. 12, 1915.
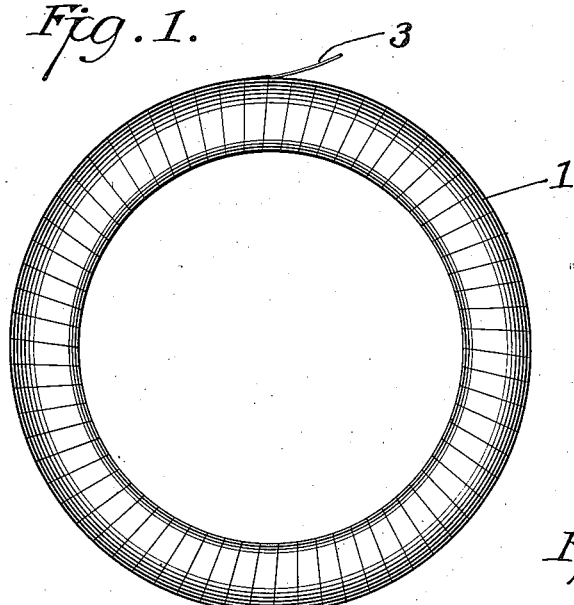
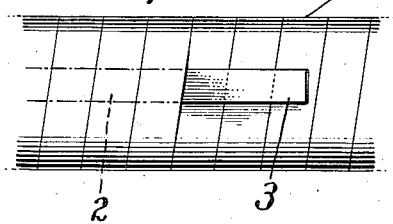
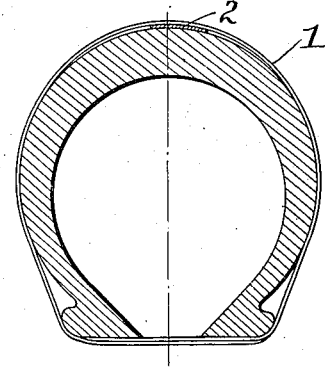
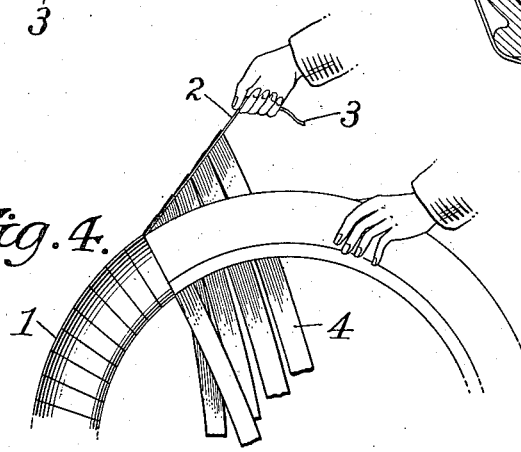
Witnesses:
Edw. W. Vaill.
B. V. Mohan.
Inventor
Ernest Hopkinson

UNITED STATES PATENT OFFICE.

ERNEST HOPKINSON, OF EAST ORANGE, NEW JERSEY.

WRAPPER FOR ARTICLES OF MERCHANDISE.

1,156,080.  Specification of Letters Patent.  Patented Oct. 12, 1915.

Application filed November 23, 1914. Serial No. 873,489.

*To all whom it may concern:*

Be it known that I, ERNEST HOPKINSON, a citizen of the United States, and residing in East Orange, county of Essex, and State of New Jersey, have invented certain new and useful Improvements in Wrappers for Articles of Merchandise, of which the following is a full, clear, and exact disclosure.

My invention relates to such articles of merchandise as are protected from wear and injury during delivery to the consumer by means of a spiral wrapping of paper or similar flexible material.

The object of my invention is to provide means in connection with such a spiral wrapper or strip of material which shall not only enable the wrapper to be quickly and easily removed, but also shall prevent the pieces of the wrapper from being scattered about during the removal of the same and which shall also hold the wrappings or convolutions of the wrapper firmly and securely in position when they are being handled so that they may reach the consumer in good condition and having a neat and pleasing appearance.

For a detailed description of a preferred form of my invention, reference may be had to the following specification and the accompanying drawing forming a part thereof in which:

Figure 1 is a side elevation of an automobile tire having a spiral wrapper thereon and my improved means for removing the same applied thereto. Fig. 2 is a plan view of a portion of a wrapped tire having the means for removing the same shown projecting therefrom. Fig. 3 is a transverse sectional view of a tire casing showing the manner of placing the wrapping and the removing means thereon. Fig. 4 is a side elevation of a tire casing indicating the manner in which the wrapping is removed and the manner in which the pieces thereof are held upon the central strip.

Referring to the drawing the numeral 1 indicates a spiral wrapper consisting of a strip of paper or similar fibrous material.

The numeral 2 indicates a strip of suitable material having greater tensile or tearing strength than the strip of material wound spirally about the article. This strip has an adhesive substance, such as glue or paste, applied to its outer surface and the spiral wrappings are placed over the same when the paste is in a wet or tacky condition. In this manner all of the convolutions or turns of the wrapping are securely fastened together to prevent the same from slipping relatively. One end of the longitudinal strip is allowed to project from beneath two of the convolutions to provide an end by which said strip may be grasped when the covering is to be removed from the tire or similar article, as indicated at 3. The longitudinal or tearing strip is preferably composed of cloth or some similar material which has a greater strength than the wrapper itself so that the wrapper will become torn before the longitudinal strip is broken.

In Fig. 3 it will be noted that the longitudinal strip which is shown in section is placed slightly at one side of the central medial plane of the tire casing. This is for the reason that one side is thereby located slightly lower on the tire casing than the other edge, thereby producing greater tension during the tearing operation at that edge and so causing the spiral strips to be torn on one side of the central strip before it is torn on the other. This causes all of the windings to adhere to the strip at one end and they will therefore not be scattered about, but may be easily retained and so disposed of all at one time. This feature of the invention is illustrated in Fig. 4 by the numeral 4.

Having thus described this form of my invention, what I claim and desire to protect by Letters Patent is:

1. In combination with a wrapper for an annular article of merchandise, consisting of a spirally wrapped strip of flexible material, a strip of material having a greater tearing resistance than said wrapper, located circumferentially of said article and attached to the successive convolutions of said wrapper to hold the latter together when the same are severed by pulling the end of said circumferential strip outwardly.

2. In combination with a wrapper for an annular article of merchandise, consisting of a spirally wrapped strip of flexible material, a strip of material having greater tearing resistance than said wrapper located circumferentially of said article within said wrapper and attached to the successive convolutions thereof.

3. In combination with a wrapper for tire casings consisting of a spirally wrapped strip of flexible material, a strip of material having a greater tearing resistance than said wrapper and located within the same and attached thereto at one side of the central longitudinal line of the circumference of said casing.

Signed at New York, county and State of New York, this 20th day of November, 1914.

ERNEST HOPKINSON.

Witnesses:
 FRANCIS BOYLE,
 EDW. W. VAILL.